(12) United States Patent
Inglis et al.

(10) Patent No.: US 8,387,031 B2
(45) Date of Patent: Feb. 26, 2013

(54) PROVIDING CODE IMPROVEMENTS FOR NESTED VIRTUAL MACHINES

(75) Inventors: Derek B. Inglis, Markham (CA); Marcel Mitran, Markham (CA); Ali I. Sheikh, Markham (CA); Kevin A. Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 12/358,564

(22) Filed: Jan. 23, 2009

(65) Prior Publication Data

US 2010/0192137 A1  Jul. 29, 2010

(51) Int. Cl.
G06F 9/45 (2006.01)
(52) U.S. Cl. .......................... 717/148; 717/136
(58) Field of Classification Search .................... 717/148
See application file for complete search history.

(56) References Cited

U.S. PATENT DOCUMENTS

| | | | |
|---|---|---|---|
| 4,456,954 A | | 6/1984 | Bullions, III et al. |
| 4,792,895 A | * | 12/1988 | Tallman ............................ 718/1 |
| 5,317,750 A | | 5/1994 | Wickersheim et al. |
| 5,390,309 A | * | 2/1995 | Onodera ........................ 718/100 |
| 5,530,820 A | * | 6/1996 | Onodera ............................ 718/1 |
| 6,075,938 A | | 6/2000 | Bugnion et al. |
| 6,351,822 B1 | | 2/2002 | Wright et al. |
| 6,397,242 B1 | | 5/2002 | Devine et al. |
| 6,834,391 B2 | | 12/2004 | Czajkowski et al. |
| 7,100,154 B2 | | 8/2006 | Hicks |
| 7,213,098 B2 | | 5/2007 | Czajkowski et al. |
| 7,257,806 B1 | * | 8/2007 | Chen et al. .................... 717/141 |
| 7,401,178 B1 | | 7/2008 | Tene et al. |
| 7,469,346 B2 | * | 12/2008 | Watson .......................... 713/193 |
| 7,536,688 B2 | | 5/2009 | Tene et al. |
| 7,552,426 B2 | * | 6/2009 | Traut ............................. 717/138 |
| 7,703,108 B2 | | 4/2010 | Sanouillet |
| 7,954,094 B2 | | 5/2011 | Cascaval et al. |
| 2004/0172629 A1 | * | 9/2004 | Tene et al. .......................... 718/1 |
| 2005/0028132 A1 | | 2/2005 | Srinivasamurthy et al. |
| 2005/0102671 A1 | | 5/2005 | Baumberger |
| 2006/0107257 A1 | | 5/2006 | Ellison |
| 2006/0206892 A1 | | 9/2006 | Vega et al. |
| 2007/0050764 A1 | | 3/2007 | Traut |

(Continued)

FOREIGN PATENT DOCUMENTS

JP 9330108 A 12/1997

OTHER PUBLICATIONS

USPTO U.S. Appl. No. 12/019,702, Oct. 11, 2012, 2 pages.

(Continued)

*Primary Examiner* — Don Wong
*Assistant Examiner* — Theodore Hebert
(74) *Attorney, Agent, or Firm* — Stephen R. Tkacs; Stephen J. Walder, Jr.; Libby Z. Toub

(57) ABSTRACT

A mechanism is provided for operating a computing system, in which an inner virtual machine translates first instructions, which are supported by the inner virtual machine, into second instructions, which are supported by an outer virtual machine. The mechanism encodes, in the inner virtual machine, third instructions into the second instructions into which the first instructions are translated, the third instructions including hints for facilitating an execution of the second instructions, and, in an event the hints are supported by the outer virtual machine, initiating the execution of the second instructions while utilizing the hints by the outer virtual machine to achieve an increased efficiency of the execution of the second instructions.

20 Claims, 2 Drawing Sheets

U.S. PATENT DOCUMENTS

Figure 1:
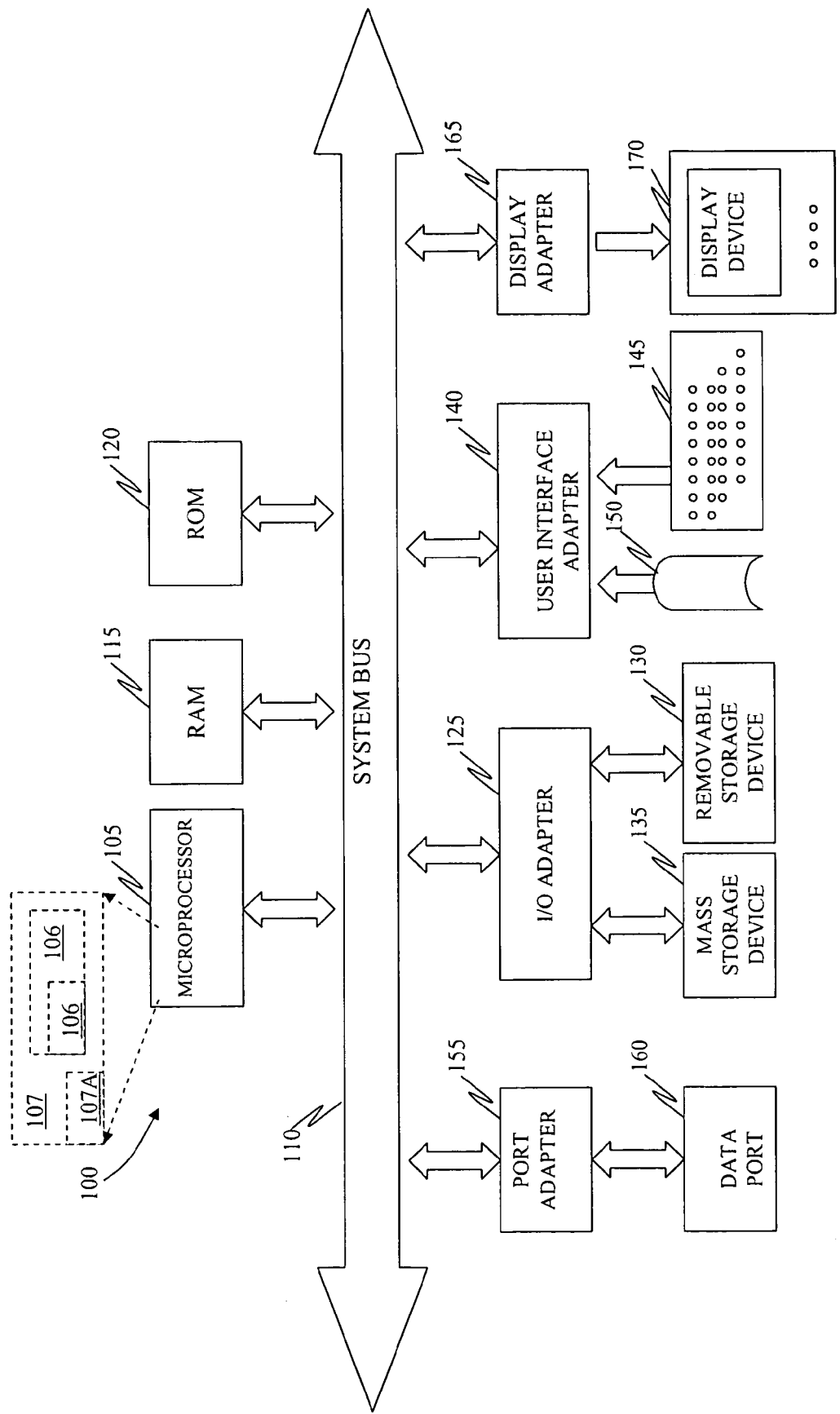

| | | | |
|---|---|---|---|
| 2007/0089111 | A1 | 4/2007 | Robinson et al. |
| 2007/0220217 | A1* | 9/2007 | Shankara ................... 711/154 |
| 2008/0127125 | A1 | 5/2008 | Anckaert et al. |
| 2008/0244546 | A1* | 10/2008 | Schmelter et al. ............ 717/158 |
| 2008/0288940 | A1* | 11/2008 | Adams et al. .................... 718/1 |
| 2008/0288941 | A1* | 11/2008 | Adams et al. .................... 718/1 |
| 2009/0119642 | A1* | 5/2009 | Brendle et al. ................ 717/116 |
| 2009/0193399 | A1* | 7/2009 | Mitran et al. ................. 717/139 |
| 2010/0169882 | A1* | 7/2010 | Ben-Yehuda et al. ............ 718/1 |
| 2011/0054879 | A1 | 3/2011 | Bogsanyl et al. |

OTHER PUBLICATIONS

USPTO U.S. Appl. No. 12/869,344, Oct. 11, 2012, 1 page.

"Z/Architecture-Principles of Operation", IBM Corporation, SA22-7832, Fifth Edition (Sep. 2005), 1114 pages.

Czajkowski, Gregorz et al., "Automated and Portable Native Code Isolation", 12th International Symposium on Software Reliability Engineering, 2001, IEEE, Nov. 27-30, 2001, 15 pages.

Deng, Yi et al., "A Communication Virtual Machine", Computer Software and Applications Conference, vol. 1, Sep. 2006, 10 pages.

Ford, Bryan et al., "Microkernels Meet Recursive Virtual Machines", In 2nd Symposium on Operating Systems Design and Implementation (1996); [retrieved on Sep. 19, 2011]; Retrieved from Internet, <URL;http:/citeseerx.ist.psu.edu/viewdoc/download?doi=10.1.1.40.7950&rep=rep1&type=pdf>, 1996, 15 pages.

Singer, Jeremy et al., "Supporting Higher-Order Virtualization", Proceedings of the 12th International Workshop on Computers on Compilers, 2006. School of Computer Science, University of Manchester, Oxford Road, Manchester, UK, 2006, pp. 1-15.

Suganuma, Toshio et al., "A Dynamic Optimization Framework for a Java Just-in-Time Compiler", ACM SIGPLAN, vol. 36, Issue 11, Nov. 2001, pp. 180-194.

Suganuma, Toshio et al., "Overview of the IBM Java Just-in-Time Compiler", IBM Systems Journal, vol. 39, No. 1, 2000, 19 pages.

Tang, Vikki et al., "A Framework of Reducing Instrusction Scheduling Overhead in Dynamic Compilers", Proceedings of the 2006 Conference of the Center for Advanced Studies on Collaborative Research, Article No. 5, 2006, 13 pages.

Waldspurger, Carl A., "Memory Resource Management in VMware ESX Server", Proceedings of the 5th Symposium on Operating Systems Design and Implementation, Dec. 9-11, 2002, 15 pages.

* cited by examiner

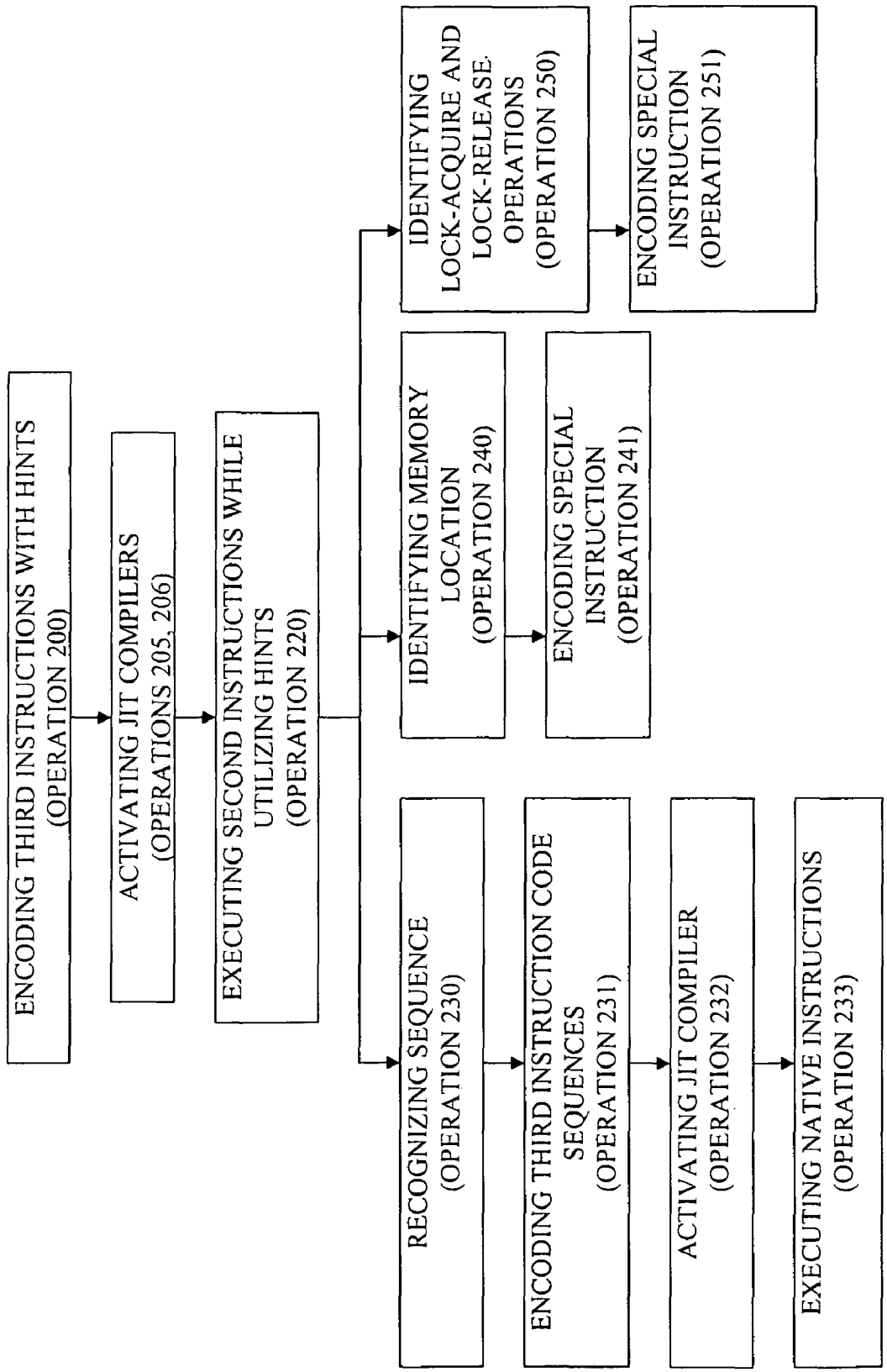

PROVIDING CODE IMPROVEMENTS FOR NESTED VIRTUAL MACHINES

BACKGROUND

Aspects of the present invention are directed to improving code in virtual machines.

Computing systems may be characterized as including nested virtual machines defined therein. In these cases, a virtual machine, such as an inner virtual machine, may be executed inside another virtual machine, such as an outer virtual machine.

With such configurations, techniques for improving the performance of the nested virtual machines have been proposed. Typically, these techniques involve the inner virtual machine communicating with the outer virtual machine by sending inner machine instructions to the outer virtual machine over a communication channel. The outer virtual machine then uses a just-in-time (JIT) compiler to translate these instructions directly to native instructions that can be executed directly on the hardware on which the outer virtual machine is executing.

It has been seen, however, that implementing a communication channel to communicate between the outer and inner virtual machines requires significant engineering effort on both virtual machines.

SUMMARY

In accordance with an aspect of the invention, a computer readable storage medium is provided having executable instructions stored thereon for executing a method of operating a computing system, in which an inner virtual machine translates first instructions, which are supported by the inner virtual machine, into second instructions, which are supported by an outer virtual machine. The method includes encoding, in the inner virtual machine, third instructions into the second instructions into which the first instructions are translated, the third instructions including hints for facilitating an execution of the second instructions, and, in an event the hints are supported by the outer virtual machine, initiating the execution of the second instructions while utilizing the hints by the outer virtual machine to achieve an increased efficiency of the execution of the second instructions.

In accordance with an aspect of the invention, a method of operating a computing system, in which an inner virtual machine translates first instructions, which are supported by the inner virtual machine, into second instructions, which are supported by an outer virtual machine is provided and includes encoding, in the inner virtual machine, third instructions into the second instructions into which the first instructions are translated, the third instructions including hints for facilitating an execution of the second instructions, and, in an event the hints are supported by the outer virtual machine, initiating the translation of the second instructions while utilizing the hints by the outer virtual machine to achieve an increased efficiency of the execution of the second instructions.

In accordance with an aspect of the invention, a computing system is provided and includes a mainframe having executable instructions stored thereon for executing native instructions, an outer virtual machine defined within the mainframe, and an inner virtual machine defined within the outer virtual machine to translate first instructions into second instructions and to encode third instructions amongst the second instructions, the third instructions including hints for facilitating an execution of the second instructions, wherein the outer virtual machine is configured to translate the second instructions into the native instructions for execution thereof by the mainframe and, in an event the outer virtual machine is supportive of the hints included in the second instructions, to use the hints to facilitate the execution of the second instructions.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a schematic diagram of a computing system in accordance with embodiments of the present invention; and FIG. 2 is a flow diagram illustrating a method of operating a computing system in accordance with embodiments of the present invention.

DETAILED DESCRIPTION

With reference to FIG. 1, an exemplary computing system 100 is provided. The computing system 100 includes a microprocessor 105 which is coupled to a system bus 110. Memory units, such as random access memory (RAM) 115 and read-only memory (ROM) 120, communicate with the microprocessor 105 through the system bus 110. In addition, the system bus 110 receives data from a data port 160 by way of a port adapter 155, and from a mass storage device 135 and a removable storage device 130 by way of an input/output (I/O) adapter 125. A user interfaces with the computing system 100 by way of input devices 150 and 145 which are coupled to the system bus 110 via a user interface adapter 140 and the microprocessor 105 provides information to the user through the display device 170 via the display adapter 165, which is also coupled to the system bus 110.

With this or a similar configuration, the microprocessor 105 may be regarded as a mainframe, or any similar computing device, including a computer readable storage medium having executable instructions stored thereon for executing native instructions of the computing system 100, an inner virtual machine 106 defined within an outer virtual machine 107 to translate first instructions into second instructions and to encode third instructions, including hints for facilitating execution of the second instructions, amongst the second instructions, and the outer virtual machine 107. The outer virtual machine 107 is defined within the mainframe to execute the second instructions by, e.g., translating the second instructions into the native instructions for execution thereof by the mainframe. In an event the outer virtual machine 107 is supportive of the hints of the third instructions, the outer virtual machine 107 utilizes the hints to achieve a relatively efficient execution of the second instructions.

As an example, the microprocessor 105, acting as a mainframe, may run IBM zSeries hardware to support a system, such as an Intel x86 Emulator, running as the outer virtual machine 107 with a PowerPC Emulator running as the inner virtual machine 106 inside the outer virtual machine 107. In this example, the PowerPC emulator has the task of executing PowerPC machine instructions. It may do so by interpretation of these instructions or by using an inner just-in-time (JIT) compiler 106A to translate these instructions to system instructions. The system, in turn, is responsible for executing all the programs that run inside it, including the PowerPC emulator. This includes the system instructions that are produced by the inner JIT compiler 106A.

To improve the performance of the system, the inner JIT compiler 106A of the inner virtual machine 106 may encode hints in specially encoded non-operation (NOP) instructions that can be deciphered by the system of the outer virtual machine 107. If the outer virtual machine 107, including an outer JIT compiler 107A, supports the specially encoded NOP instructions, it can then take action that improves performance of the overall system. On the other hand, if the outer virtual machine 107 does not support the specially encoded NOP instructions, the inner virtual machine 106 and programs can still be executed on the outer virtual machine, albeit without a performance acceleration.

In accordance with the example given above, the inner JIT compiler 106A embeds sequences of NOP or, some cases, pseudo NOP instructions in the PowerPC instructions. In this way, the inner JIT compiler 106A informs the outer virtual machine 107 of some intrinsic features about the PowerPC instructions that is being executed inside the inner virtual machine 106.

Here, a pseudo-NOP instruction is an instruction that is chosen such that it has no effect on a state of a program whose code it is inserted into if it is inserted at a particular point in the code of the program. For example, if a particular register is not in use due to the register being regarded as being, e.g., dead, at a particular point in the program, then an instruction that modifies that register is a pseudo-NOP instruction. Within Intel architecture, some examples of pseudo-NOP instructions include: "lea eax, [eax + #datum]"; if eax is dead at this point, and "test eax, #datum"; if the eflags register is dead at this point in the program.

The inner JIT compiler 106A has the capability of introducing either NOP or pseudo-NOP instructions in the instruction stream that the inner JIT compiler 106A produces. As noted above, these instructions can then be used to perform performance optimizations by the outer virtual machine 107.

Generally, the hints in the NOP or pseudo-NOP instructions will only make sense when the hints are included in the instruction stream that the inner virtual machine 106 presents to the outer virtual machine 107. Thus, since various programs running on the outer virtual machine 107 may rely upon similar NOP instructions but will not necessarily be doing so for the purpose of communicating with the inner virtual machine 106, care must be given in determining which programs of the outer virtual machine 107 may receive the hints. Also, it may be necessary to insure that interpretations of the instructions of any one program by the outer virtual machine 107 does not negatively affect the interpretations of the instructions of any other program.

For this purpose, the NOP instructions interpreted to have hints by 107 may be organized into safe and trusted classes for which safeguards are provided. Here, safe instructions elicit a response from the outer virtual machine 107 that does not affect a correctness of the program being run. Conversely, a trusted instruction is one that elicits a response from the outer virtual machine 107 that may cause incorrect execution if it was being provided by a rogue (untrusted) inner program rather than the inner virtual machine 106.

To alleviate this problem, the inner virtual machine 106 could use a string of special NOP instructions before each hint in its instructions. This would reduce the probability of incorrect execution of an untrusted program that happens to have the same string of NOP instructions. Alternatively, the user may specify command line options to authorize the use of trusted optimizations.

For optimizations using instructions classified as being safe, the inner virtual machine 106 may identify a frequently executed sequence of code by placing a special NOP instruction at the boundaries of the code. The outer virtual machine 107 may then use this as a hint to perform dynamic translation using the outer JIT compiler 107A into native code of the computing system 100. On subsequent encounters of this frequently executed sequence of inner code, the outer virtual machine 107 may chose to execute the previously translated native code.

For optimizations using instructions classified as being trusted, the inner virtual machine 106 may identify that a given memory location is thread-local by placing a special NOP instruction before the instruction that accesses that memory location. The outer virtual machine 107 may then use this as a hint to skip the need for any synchronization that it would have had to perform to enforce memory consistency. The outer virtual machine 107 may also use this as a hint to allow it to optimize or eliminate accesses to this memory location.

In another embodiment, the inner virtual machine 106 may identify the memory consistency requirements of a given memory location by placing a special NOP instruction before corresponding memory access instructions. For example, the inner virtual machine 106 may identify whether loading operations or storing operations may be re-ordered or not.

In yet another embodiment, the inner virtual machine 106 may identify lock-acquire and lock-release operations that it is trying to perform by placing a special NOP instruction around the sequence of instructions that performs these operations. The outer virtual machine 107 may then use this information to understand the higher level operation being performed by the inner machine instructions and thereby optimize the lock operation as is deemed to be appropriate.

With reference now to FIG. 2, a computer readable medium having executable instructions stored thereon for executing a method of operating a computing system is provided. In the computing system, an inner virtual machine translates first instructions, which are supported by the inner virtual machine, into second instructions, which are supported by an outer virtual machine.

The method includes encoding, in the inner virtual machine, third instructions into the second instructions into which the first instructions are translated, the third instructions including hints for facilitating a translation of the second instructions (operation 200), and, in an event the hints are supported by the outer virtual machine, initiating an execution of the second instructions while utilizing the hints, included in the third instructions, by the outer virtual machine to achieve an increased efficiency of the execution of the second instructions (operation 220).

To achieve this method, the method further includes activating a just-in-time (JIT) compiler of the inner virtual machine to translate the first instructions into the second instructions and to encode the third instructions (operation 205), activating a JIT compiler of the outer virtual machine to translate the second and/or third instructions into the native instructions (operation 206).

In accordance with embodiments of the invention, the third instructions may include non-operation instructions or pseudo non-operation instructions.

In accordance with still further embodiments of the invention, the method may further include recognizing, at the inner virtual machine, a sequence of the second instructions (operation 230), encoding preselected third instruction code sequences at boundaries of the sequence of the second instructions (operation 231), and, at a first encounter of the outer virtual machine with the preselected third instruction code sequences, activating the JIT compiler of the outer virtual machine to perform dynamic translation of the sequence of the second instructions into corresponding ones of the native instructions (operation 232). At this point, the method may include executing the corresponding ones of the native instructions by the outer virtual machine at a subsequent encounter of the outer virtual machine with the sequence of the second instructions or, alternatively, with the preselected third instruction code sequences (operation 233).

The method may also further include identifying, at the inner virtual machine, a given memory location with the computing system as being thread-local (operation 240), encoding a first special third instruction with second instructions that access the given memory location (operation 241). In this case, the first special third instruction relates to a re-ordering of loading and/or storing operations with respect to the given memory location and the outer virtual machine responds to the first special third instruction by skipping a synchronization operation or by modifying access operations with respect to the given memory location.

The method may also include identifying, at the inner virtual machine, lock-acquire and lock-release operations to be performed at the inner virtual machine (operation 250), and encoding a second special third instruction with second instructions that relate to the lock-acquire and lock-release operations (operation 251). In this case, the outer virtual machine responds to the second special third instruction by recognizing higher level corresponding operations.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A computer readable storage device having executable instructions stored thereon for executing a method of operating a computing system, the method comprising:
    translating, in an inner virtual machine, first instructions that are supported by the inner virtual machine into second instructions that are supported by an outer virtual machine, wherein the inner virtual machine communicates with the outer virtual machine by sending inner machine instructions to the outer virtual machine over a communication channel;
    encoding, in the inner virtual machine, third instructions into the second instructions into which the first instructions are translated, the third instructions including hints for facilitating an execution of the second instructions; and
    responsive to the hints being supported by the outer virtual machine, initiating the execution of the second instructions utilizing the hints by the outer virtual machine to achieve an increased efficiency of the execution of the second instructions.

2. The computer readable storage device according to claim 1, wherein the method further comprises:
    activating a just-in-time (JIT) compiler of the inner virtual machine to translate the first instructions into the second instructions and to encode the third instructions; and
    activating a JIT compiler of the outer virtual machine to translate the second instructions into the native instructions.

3. The computer readable storage device according to claim 1, wherein the third instructions comprise non-operation instructions.

4. The computer readable storage device according to claim 1, wherein the third instructions comprise pseudo non-operation instructions.

5. The computer readable storage device according to claim 1, wherein the use of the hints improves an efficiency of the translation of the second instructions by the outer virtual machine.

6. The computer readable storage device according to claim 2, wherein the method further comprises:
    recognizing, at the inner virtual machine, a sequence of the second instructions;
    encoding preselected third instruction code sequences at boundaries of the sequence of the second instructions; and
    at a first encounter of the outer virtual machine with the preselected third instruction code sequences, activating the JIT compiler of the outer virtual machine to perform dynamic translation of the sequence of the second instructions into corresponding ones of the native instructions.

7. The computer readable storage device according to claim 6, wherein the method further comprises executing the corresponding ones of the native instructions by the outer virtual machine at a subsequent encounter of the outer virtual machine with the sequence of the second instructions.

8. The computer readable storage device according to claim 6, wherein the method further comprises executing the corresponding ones of the native instructions by the outer virtual machine at a subsequent encounter of the outer virtual machine with the preselected third instruction code sequences.

9. The computer readable storage device according to claim 2, wherein the method further comprises:
    identifying, at the inner virtual machine, a given memory location with the computing system as being thread-local; and
    encoding a first special third instruction with second instructions that access the given memory location.

10. The computer readable storage device according to claim 9, wherein the first special third instruction relates to a re-ordering of loading or storing operations with respect to the given memory location.

11. The computer readable storage device according to claim 9, wherein the outer virtual machine responds to the first special third instruction by skipping a synchronization operation.

12. The computer readable storage device according to claim 9, wherein the outer virtual machine responds to the first special third instruction by modifying access operations with respect to the given memory location.

13. The computer readable storage device according to claim 2, wherein the method further comprises:
    identifying, at the inner virtual machine, lock-acquire and lock-release operations to be performed at the inner virtual machine; and encoding a second special third instruction with second
instructions that relate to the lock-acquire and lock-release operations.

14. The computer readable storage device according to claim 13, wherein the outer virtual machine responds to the second special third instruction by recognizing higher level corresponding operations.

15. A method of operating a computing system, the method comprising:
    translating, in an inner virtual machine, first instructions that are supported by the inner virtual machine into second instructions that are supported by an outer virtual machine, wherein the inner virtual machine communicates with the outer virtual machine by sending inner machine instructions to the outer virtual machine over a communication channel;
    encoding, in the inner virtual machine, third instructions into the second instructions into which the first instructions are translated, the third instructions including hints for facilitating an execution of the second instructions; and
    responsive to the hints being supported by the outer virtual machine, initiating the execution of the second instructions utilizing the hints by the outer virtual machine to achieve an increased efficiency of the execution of the second instructions.

16. A computing system, comprising:
    a mainframe having executable instructions stored thereon for executing native instructions;
    an outer virtual machine defined within the mainframe; and
    an inner virtual machine defined within the outer virtual machine to translate first instructions into second instructions and to encode third instructions amongst the second instructions, the third instructions including hints for facilitating an execution of the second instructions, wherein the inner virtual machine executes within the outer virtual machine and wherein the inner virtual machine communicates with the outer virtual machine by sending inner machine instructions to the outer virtual machine over a communication channel,
    wherein the outer virtual machine is configured to translate the second instructions into the native instructions for execution thereof by the mainframe and, responsive to the outer virtual machine being supportive of the hints included in the second instructions, to use the hints to facilitate the execution of the second instructions to achieve an increased efficiency of the execution of the second instructions.

17. The method according to claim 15, wherein the method further comprises:
    activating a just-in-time (JIT) compiler of the inner virtual machine to translate the first instructions into the second instructions and to encode the third instructions; and
    activating a JIT compiler of the outer virtual machine to translate the second instructions into the native instructions.

18. The method according to claim 17, wherein the method further comprises:
    recognizing, at the inner virtual machine, a sequence of the second instructions;
    encoding preselected third instruction code sequences at boundaries of the sequence of the second instructions; and
    at a first encounter of the outer virtual machine with the preselected third instruction code sequences, activating the JIT compiler of the outer virtual machine to perform dynamic translation of the sequence of the second instructions into corresponding ones of the native instructions.

19. The method according to claim 17, wherein the method further comprises:
    identifying, at the inner virtual machine, a given memory location with the computing system as being thread-local; and
    encoding a first special third instruction with second instructions that access the given memory location.

20. The method according to claim 17, wherein the method further comprises:
    identifying, at the inner virtual machine, lock-acquire and lock-release operations to be performed at the inner virtual machine; and
    encoding a second special third instruction with second instructions that relate to the lock-acquire and lock-release operations.

* * * * *